United States Patent

[11] 3,590,784

| [72] | Inventor | Howard Gene Fly<br>Box 33, Ovando, Mont. 59854 |
|---|---|---|
| [21] | Appl. No. | 819,389 |
| [22] | Filed | Apr. 25, 1969 |
| [45] | Patented | July 6, 1971 |

[54] LIVESTOCK TIPPING TABLE AND STALL
16 Claims, 10 Drawing Figs.

| [52] | U.S. Cl. | 119/103 |
|---|---|---|
| [51] | Int. Cl. | A61d 03/00 |
| [50] | Field of Search | 119/103 |

[56] References Cited
UNITED STATES PATENTS

| 858,830 | 7/1907 | Sheeley | 119/103 |
|---|---|---|---|
| 2,000,122 | 5/1935 | Cameron | 119/103 |
| 2,483,909 | 10/1949 | Keirsey | 119/103 |
| 2,967,510 | 1/1961 | Stoody | 119/103 |
| 3,244,151 | 4/1966 | Gebhart | 119/103 |

*Primary Examiner*—Hugh R. Chamblee
*Attorney*—Stevens, Davis, Miller & Mosher

ABSTRACT: An improved livestock-tipping table and a stall associated therewith.

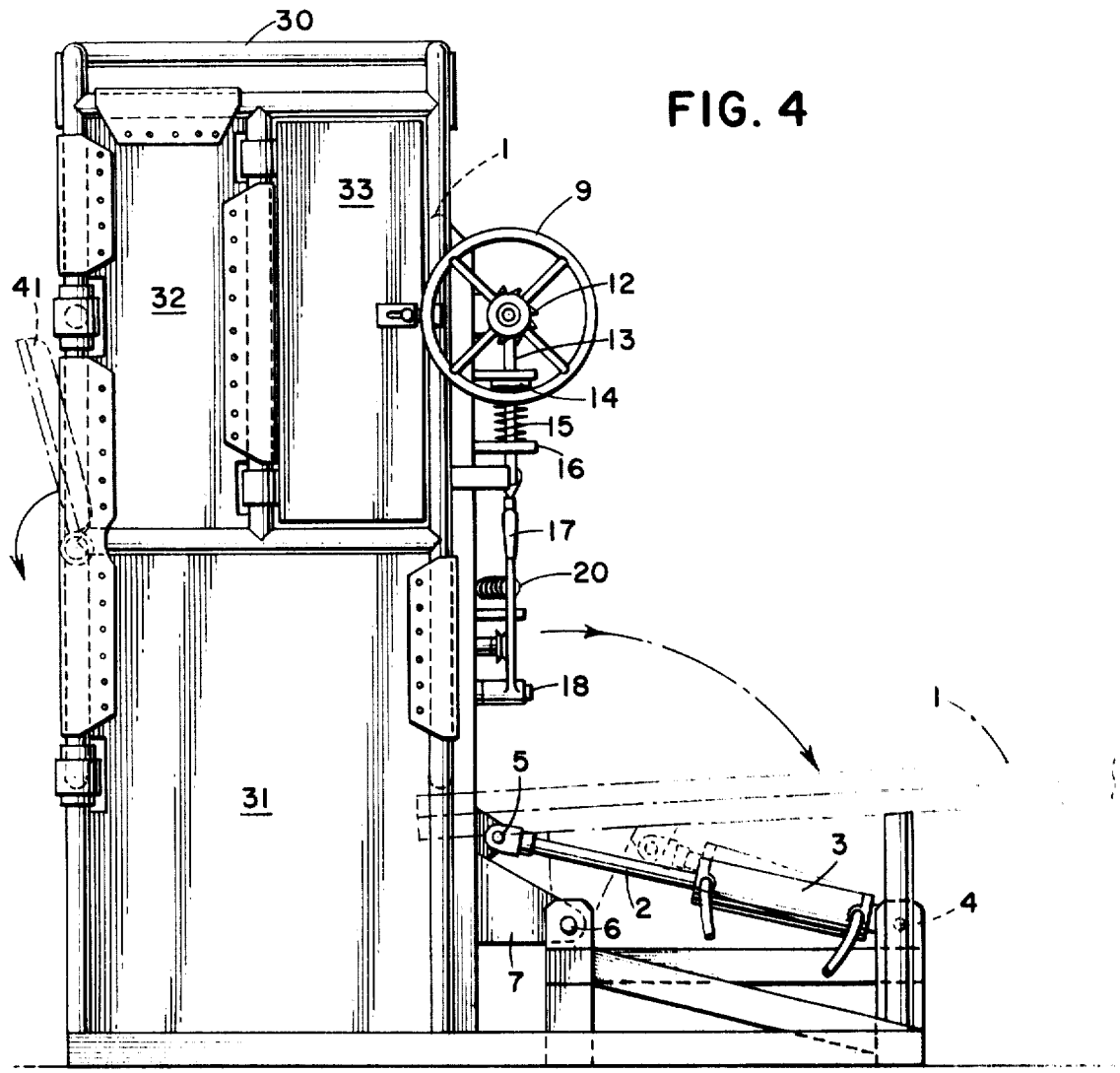
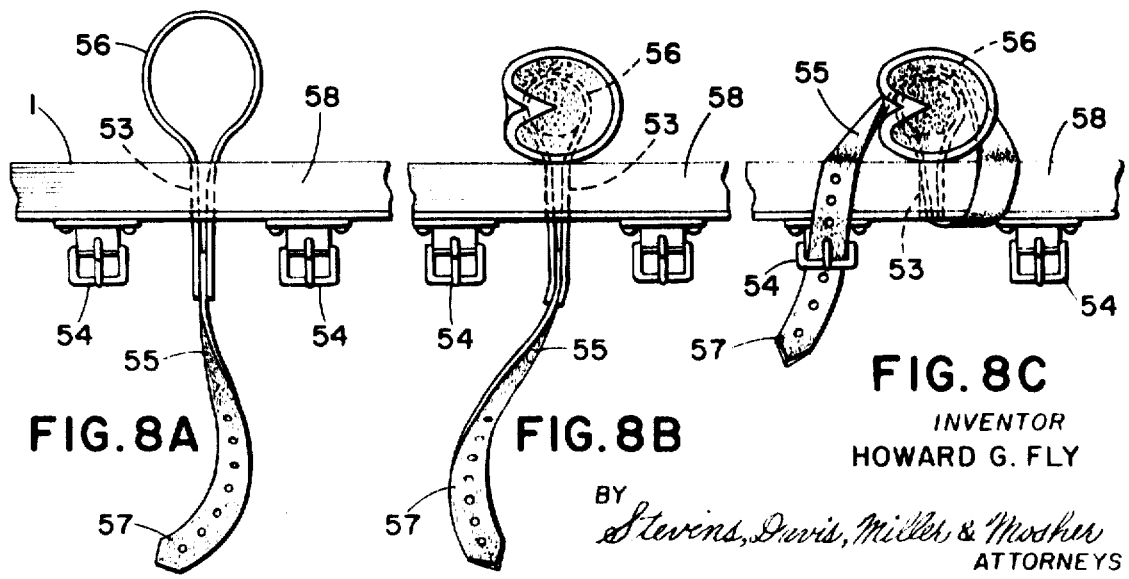

INVENTOR
HOWARD G. FLY

LIVESTOCK TIPPING TABLE AND STALL

The invention disclosed herein relates to a livestock-tipping table which is adapted to shift a horse or the like from a normal standing position to a generally horizontal position so as to enable a person to perform various operations upon the animal while it is laying upon its side.

Livestock-tipping tables are generally well known in the veterinary field as is exemplified by U.S. Pat. No. 3,308,790. Known tipping tables incorporate various disadvantages which it is the object of the present invention to overcome.

One of the principle disadvantages generally found in known tipping tables is that in moving from a vertical towards a horizontal position they tend to "kick the ground out from under the feet" of the animal thereby creating a sense of panic within the animal. It is a primary object of the present invention to provide a tipping table so arranged that it first lifts vertically off the ground before commencing to turn towards a horizontal position.

Another disadvantage generally found in known tipping tables resides in the fact that the straps for securing the animal thereto are not easily adjustable either lengthwise or vertically. It is another object of the present invention, therefore, to provide a tipping table having securing straps which are easily adjustable in the lengthwise direction of the animal, that is to say, in the direction running from the animal's head towards its tail and which are also simultaneously easily adjustable in a vertical direction so as to accommodate different sizes of animals. In this regard it is further noted that the adjustability of straps, as provided herein, also serves the purpose of avoiding the situation whereby a tightening of the straps tends to lift the animal off the ground. The strap arrangement provided herein, on the other hand, is such that a tightening thereof results in the animal being drawn against the table rather than upwardly along the table height.

It is a further object of the present invention to provide a strap arrangement which is easily and quickly releasable so as to permit a rapid release of the animal from the table.

It is a still further object of the present invention to provide a novel stall construction for use in conjunction with the aforementioned table so as to permit effective positioning of the animal against the table while being strapped thereagainst without the animal struggling to remove itself therefrom.

Other objects of the present invention are those which are obvious or inherent in the herein presented disclosure of a preferred embodiment of realization details of which are hereafter described with reference to the accompanying drawings wherein:

FIG. 4 is a side elevation view of same;

Figure 1:
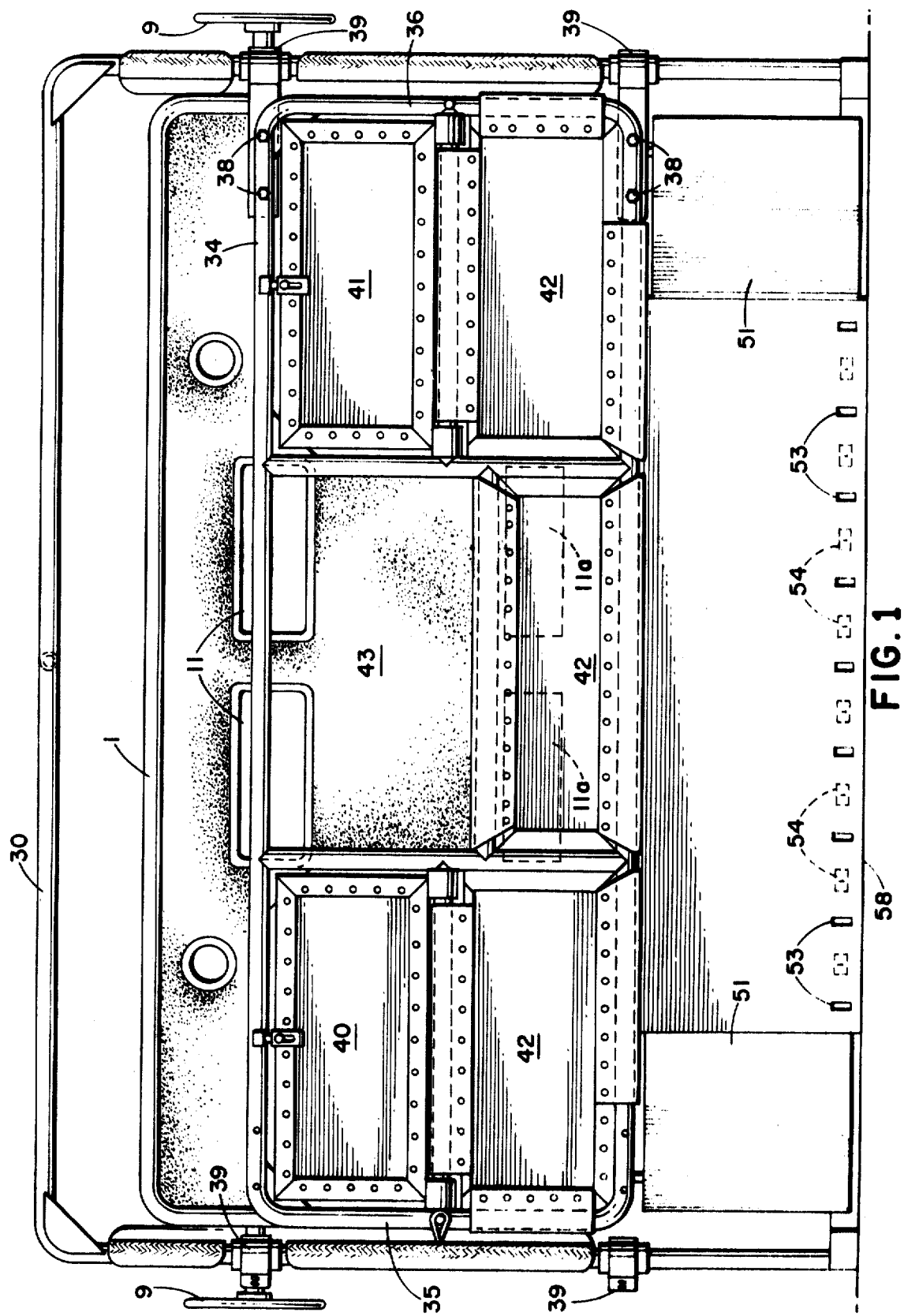
FIG. 1 is a front elevation view of the apparatus according to the present invention.

FIGS. 8A, B, and C are bottom plan views of the table showing the method of securing animal's legs.

With reference to the drawings, the tipping planar table 1 extends vertically in order to permit strapping of the animal thereagainst. After the animal has been securely strapped to the table 1, a fluid-actuated piston rod 2 is caused to retract within cylinder 3 by means of fluid pressure acting within said cylinder. Since one end of the cylinder 3 is pivotally mounted about a fixed pivot point 4 while the opposing end of piston rod 2 is pivotally mounted at pivot point 5 on the table 1, the retraction of said rod 2 results in a tilting of the table about fixed pivot axis 6. In this regard it is to be noted that table 1 includes a rigid horizontal link 7 extending perpendicularly from the table and pivotally mounted at one end thereof about fixed pivot point 6, which pivot point is located distally from the table itself. This means that the table 1 pivots about an axis 6 which is spaced from the table itself so that the table as a whole revolves rather than rotates about said axis 6. Stated otherwise, it may be said that the table 1, as a whole, follows an arcuate path about axis 6. This is distinct from the situation which would exist if the axis 6 instead of being located at a distance from the table 1, as in the present invention, were located within the boundaries of said table 1. In this latter instance the table would not undergo any translational movement about its pivot axis but would simply rotate about said axis.

Figure 5:
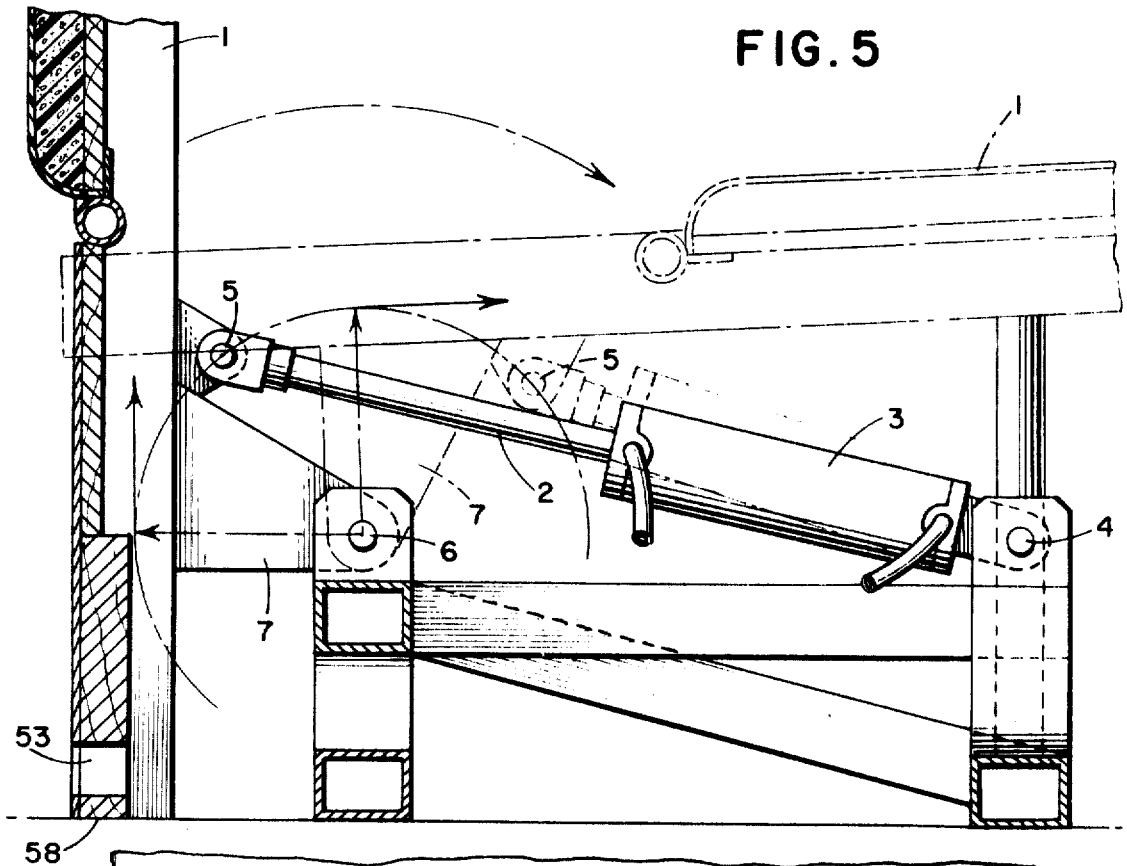
FIG. 5 is an enlarged side elevation view of the table-tilting mechanism, according to the invention.
Figure 6:
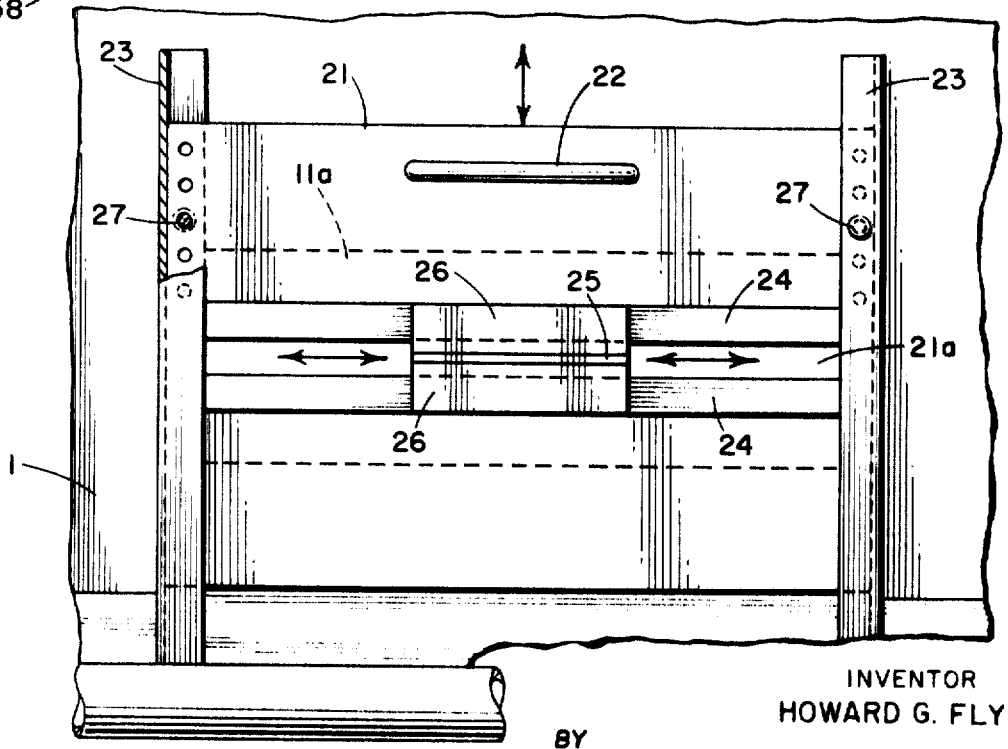
FIG. 6 is an enlarged elevational view of the belt-adjusting plate.
Figure 7:
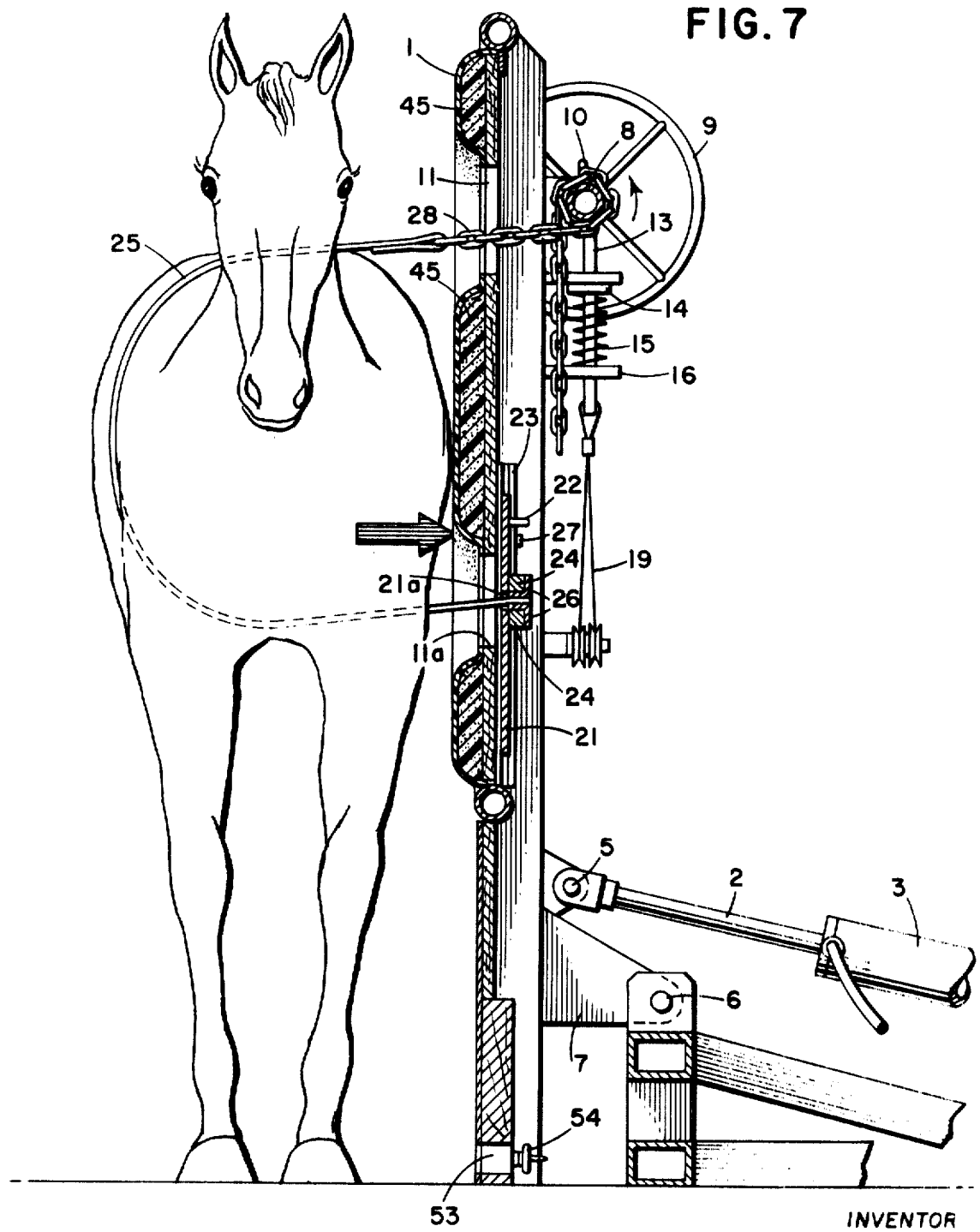
FIG. 7 is a vertical transverse sectional view of the belt-adjusting plate and tightening mechanism, taken on line 7–7 of FIG. 2.

The practical meaning of the foregoing described arrangement is simply that, at the instant shown in FIGS. 4 and 5 wherein the table is vertical and arm 7 is horizontal, a retraction of piston rod 2 within cylinder 3 results in a purely vertical movement of said table 1 and this purely vertical movement causes a lifting of the animal adjacent to the table without any sidewise shifting of the animal, especially at its feet. The movement of the table resolves itself into a progressively diminishing vertical component and a correspondingly increasing horizontal component as the table continues to pivot about axis 6 pursuant to rotation of arm 7 from a purely horizontal position towards a vertical or 12:00 o'clock position. It is seen, therefore, that the animal initially undergoes a purely vertical component of movement and then progressively tips towards a horizontal position.

The location of pivot axis 5 along the height of table 1 may be selected in accordance with standard engineering principles, it being obvious that if axis 5 were positioned in a vertical plane below the plane of axis 6, the action of the fluid cylinder 3 upon piston rod 2 would have to be reversed relative to its action in the instance in which axis 5 is located in a plane about that of axis 6. Fluid cylinder 3 may be hydraulic by or pneumatically actuated by a not shown fluid-pumping means of conventional type which is controllable to move piston rod 2 in either of opposite directions so as to bring the table from a vertical to a horizontal position, and vice versa. Alternatively means 2 and 3 could comprise an electrical device such as a solenoid or for that matter any other electrical power driven device.

Figure 2:
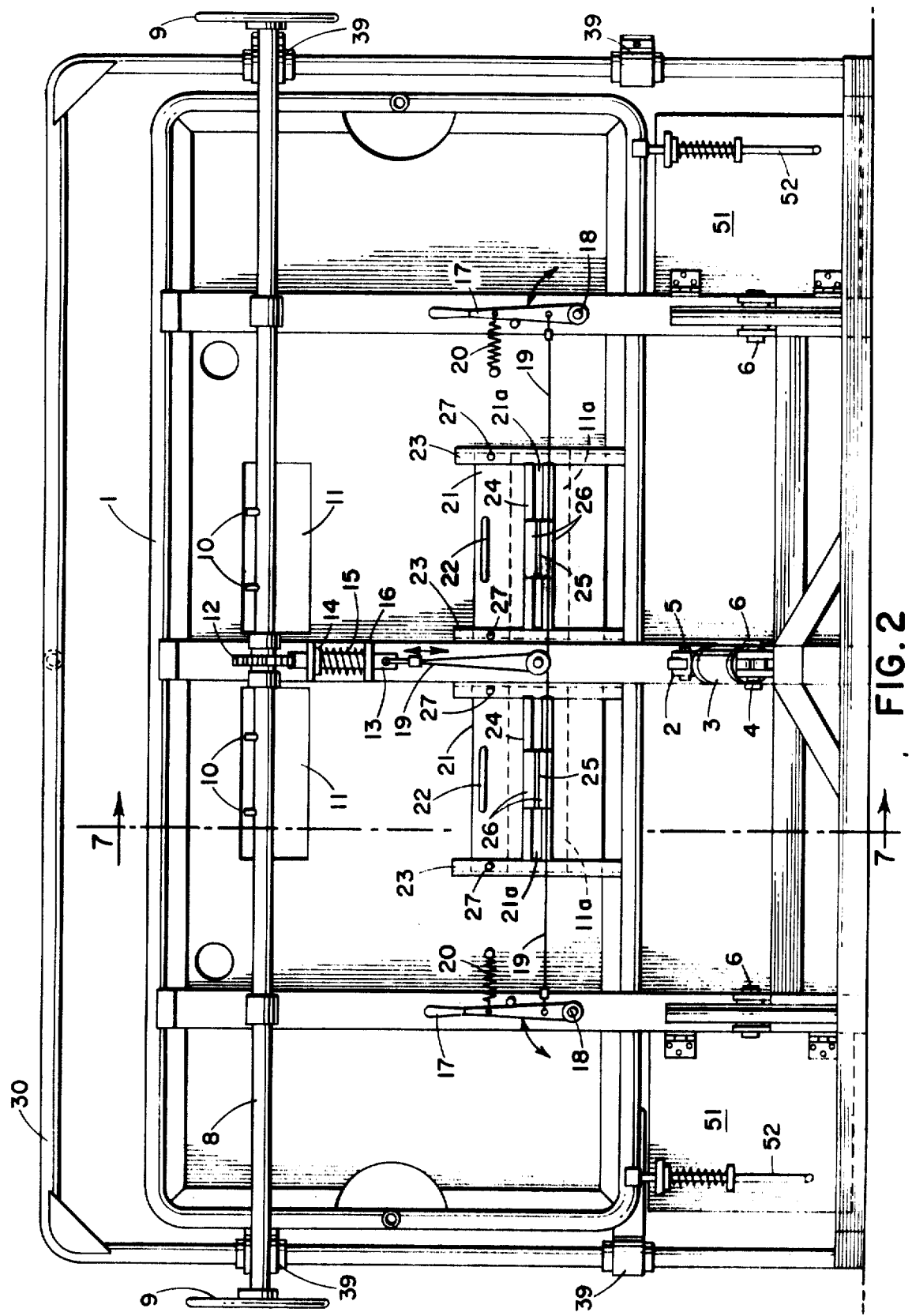
FIG. 2 is a rear elevation view of same.
Figure 3:
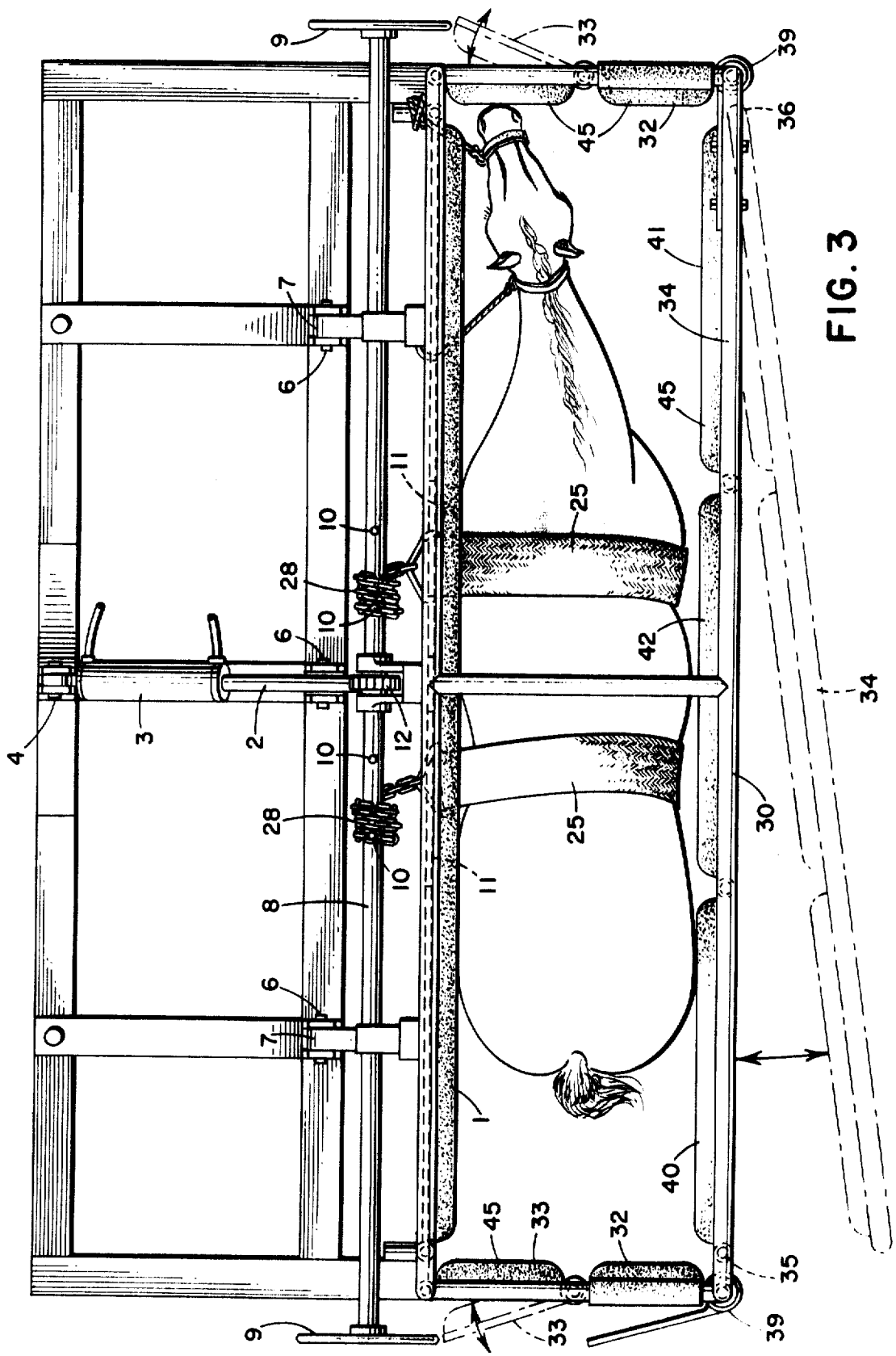
FIG. 3 is a top plan view of same.

An acceptable length for arm 7 is about 12 inches, it being understood, however, that the longer this arm is, the more pronounced will be the vertical lifting action at the moment that said arm commences to move from its horizontal position. FIG. 2 shows the table as seen from the back and it is seen in this Figure that the table includes a shaft 8 rotatably mounted thereon with handwheels 9 at each end thereof. Shaft 8 includes a number of axially spaced groups of radially extending pins 10 which are accessible from the front of the table through access openings 11. A cog wheel 12 is integral with shaft 8 and is engaged by a toothed locking rod 13 which includes a flange 14 against which bears one end of a coil spring 15, the other end of which bears against an abutment 16 which is fixedly mounted on the table. It is seen, therefore, that spring 15 normally acts to urge the rod 13 into engagement with the ratchet teeth on wheel 12. Rod 13 may be released from said wheel 12 by the operator pivoting either of release arms 17 about their respective pivot axis 18, which arms 17 are connected to the bottom of rod 13 by means of suitable cable means 19. Said arms 17 are each biased by springs 20 towards the position whereby rod 13 engages wheel 12.

At a distance beneath each opening 11 on the table 1 there is mounted a strap buckle plate 21 which includes a gripping handle 22 for enabling a person to slide plate 21 vertically within the guide rail means 23, which guide rail means are fixedly mounted on the back of the table. Extending horizontally along each plate 21 is a through opening 23 bounded along its upper and lower edges by a guide rail means 24. One end of the belt 25 extends through the opening 23 to a buckle means 26 which is attached to slide horizontally along the rail means 24. The plates 21 may be secured at various vertical positions by means of the locking means 27. It is seen, therefore, that the lower end of belt 25 may be adjusted in a horizontal direction simply by moving buckle means 26 along rail means 24 while this same lower end of the belt may simultaneously be adjusted vertically by moving the plate 21 within the rail means 23.

The two belts 25 each comprise a wide flat strip of conventional belting material, one end of which is secured to buckle 26 and the upper end of which is connected to chain 28. The chains 28 in turn each pass through a respective opening 11 in table 1 and each is wrapped for at least one turn around shaft 8 with pins 10 fitting through the chain links. The chain may be moved horizontally along shaft 8 in order to engage either one of the axially spaced apart groups of pins 10. In this regard it should be noted that two belts are used at any one time to secure an animal to the table so that an individual belt and its associated chain passes through each one of the openings 11.

It is, therefore, seen that each of the two belts is horizontally adjustable along its upper end in accordance with the distance between the groups of pins 10 which are accessible through each opening 11.

The operation of the table *per se* will now be described. Primarily, an animal such as a horse is positioned sidewise against the front surface of the table 1. The person or persons operating the table then manually pass the loose ends of each of the chains 28 through the openings 11 and around shaft 8 with the pins 10 extending through the chain links. The wheel 9 is then rotated so as to pull the chains through the openings 11 until the belts 25 are snug around the animal's torso. A selection of which groups of pins 10 is to be used and a selection of the height of the plates 21 is made in accordance with the size of the particular animal. The buckles 26 are slid along the rails 24 in accordance with which of the groups of pins 10 are being used for the particular animal. The shaft 8 is continued to be rotated until the animal is securely strapped to the front side of the table. Reverse rotation of shaft 8 is prevented by the locking action of plunger 13 with cog wheel 12. Once the animal is securely strapped to the front of the table, the operator actuates the power means 2, 3, whereby table 1 initially performs a purely upward movement and gradually progressively tips towards a horizontal position. Actually the table 1 never reaches a totally horizontal position but stops at a position at approximately 3° before reaching the horizontal.

After the necessary operations have been performed upon the animal the power means 2, 3 is actuated in a reverse direction in order to return table 1 to its vertical position. Either one of the arms 17 is then pivoted in order to release rod 13 from wheel 12, whereupon the tension in the belts causes the chains to spin shaft 8 until the chain free ends by their own momentum are ejected forwardly through openings 11 and fall free of the animal.

The present invention furthermore includes a novel stall for confining the animal while it is being strapped to the table 1. Said stall includes a stationary frame work 30 which can be made up of standard pipe. The frame work 30 is closed off at each end thereof by means of a lower fixed panel 31, as well as an upper fixed panel 32. A movable upper fixed panel 33 nearest to the table is operable so as to permit access to the animal's head after it has been strapped to the table 1. A said movable panel 33 is located at each end of the frame work 30 so that either the left or the right side of the animal may be placed against the table 1, while still providing access to the animal's head.

The front side of the frame 30 is closed by a gate 34 which is hingedly mounted to frame 30 at both ends 35 and 36 of said gate by a hinge means comprising pins 38 and hinge elements 39. The pins 38 are easily removable from either group of hinge elements 39, that is at the left or the right side of the frame 30, so that the gate 34 may correspondingly be swung at either end thereof.

Since the animal may be placed with either its right or left side against the table 1, the gate 34 includes movable panels 40 and 41 at the opposite ends thereof, the other panels 42 on the gate being stationary. The middle portion of the gate 43 is permanently open.

The operation of the stall is as follows:

If the animal is to be placed with its right side against the table 1, the pins 38 are removed from the right end hinge elements 39 so that the gate 34 remains hingedly supported at its left-hand end. The gate 34 is thereupon opened by being swung upon its hinges 35 and the animal is led into the stall with its head facing the left-hand closed panel 33. The gate 34 is thereupon closed with pins 38 being reinserted into hinge elements 39 at the right-hand end of the gate 35, it being understood that at least panel 40 is closed at this time. After the gate is closed the operator working from the front through open panel 43 passes the loose chain ends through the openings 11 whereupon another operator working at the backside of table 1 wraps the chains around shaft 8 and turns the shaft by means of the handwheel 9 so as to tighten the belts about the animal's torso. After the animal is securely strapped to the table, the gates 40, 41 and gates 33 at both ends of frame work 30 may be opened so as to permit further operations to be performed upon the animal, after which the table 1 may be tipped towards the horizontal as previously described. It is to be understood that all interior portions of the stall such as the end panels 31, 32, 33 and the gate panels 40, 41, 42 are padded as at 45 in order to avoid injury to the animal. The purpose in having the gate ends closed at 40, 41 and 42 is to obviate struggling by the animal and possible consequent injury thereto which would most probably occur if the stall were open at panel 33 and panel 40 while the animal were being strapped against the table with its right side thereagainst. Conversely, the panels 41 and 33 at the right end of the stall should be closed while the animal is being strapped to the table with its left side thereagainst.

The table further includes a hinged panel 51 at each lower corner thereof which is securable to the remainder of the table by a spring-latch means 52 so as to form a flat planar surface with the remainder of the table. However said latch means is releasable so as to permit the doors 51 to be swung down perpendicularly to the main portion of the table thereby permitting closer access to the animal's head and tail regions while the table is in its tipped position.

The table also includes a series of through slots 53 alternating with a series of buckles 54 along the bottom edge of the table 1. A strap 55 having a closed loop 56 at one end thereof extends through one of the slots 53 with the loop on the front side of the table whereby the animal's hoof may be inserted therethrough. The straight part 57 of the strap is then pulled backwards through a slot 53 so as to tighten the loop around the animal's hoof and said straight part is then passed forwardly under the bottom edge 58 of the table and around the animal's ankle making one complete turn therearound and is then passed back under said edge 58 and is drawn through the buckle 54 and hooked thereto. The foregoing sequence is illustrated in FIGS. 8A to 8C.

It is understood that a separate strap means is included for each leg of the animal which is to be secured to the table 1. The series of slots and buckles permits one to spread the animal's hoofs along the length of the table as desired.

In summary as to the advantages of the foregoing described table and stall, the following is noted.

The fact that once the belts have been placed around the animal they remain movable, provides the advantage that they may still be moved fore and aft in order to obtain correct positioning relative to the animal. Both belts come out of the table at the level of the animal's brisket and flank passing over the animal's withers and hips then directly back through the table. The advantage to having the rotating shaft positioned on the back of the table is that the pull against the animal is horizontal not vertical. Thus, when the tightening shaft is turned the animal is pulled squarely against the table and not up, which causes a rolling affect placing the animal in a bind when his legs are secured to the table. Also, because the animal is secured squarely on the table by horizontal pressure while the table is in the vertical position the animal cannot rear or lunge once it is bound to the table.

The use of the herein disclosed gate to control the animal prior to being strapped to the table and after its release constitutes a definite innovation. The gate panels give access to both the head and tail areas through the ends of the gate, the open center section allowing access to the areas of the animal being strapped to the table while the two hinged side panels may be opened to expose the front and rear portions of the animal. This gate makes controlling the animal a one man operation rather than one requiring several. Also, because the gate may be hinged to either end, the process of control is the same regardless of which side of the animal is being strapped to the table.

Various of the herein presented details of a preferred embodiment of realization are illustrative and not limitative of the inventive concepts.

I claim:

1. A livestock-tipping table comprising a planar member which is positionable in a generally vertical position and which is revolvable in its entirety about a horizontal axis, a belt means having one end which is simultaneously adjustable in the horizontal and vertical directions along said table and an opposite end which is adjustable along the horizontal direction of said table, a rotatable shaft extending horizontally along said table, one end of said belt means being windable about said shaft, an opposite end of said belt means extending through said table and being connected to a buckle means, wherein said buckle means is slidably mounted along a plate means which in turn is slidably mounted relative to said table.

2. The table of claim 1 including hinged doors at the bottom corner portions of said member and latch means for securing said doors in a common plane with the remainder of said member.

3. The table of claim 1, including a series of through slots alternating with a series of strap buckles along the bottom edge of said member, a strap means including a closed loop and a straight portion extending therefrom, said loop being positioned on the front side of said member with said straight portion extending rearwardly through a said slot, said straight portion being adapted to be hooked to a said buckle.

4. The table of claim 1, wherein said axis of said member is distally located from the boundaries of the member itself.

5. The tipping table of claim 4, including a link arm extending perpendicularly and rigidly from said member and pivoted about said axis, a power means for revolving said table about said axis.

6. The tipping table of claim 4 wherein said means for revolving said table comprises a fluid cylinder and a piston rod slidable axially therein between an extended and a retracted position relative to said cylinder, one end of said cylinder being pivotally mounted about a fixed pivot axis and one end of said piston rod being pivotally mounted to said table.

7. The tipping table of claim 4 wherein the distance between said axis and said member is substantially 12 inches.

8. The tipping table of claim 4 further including a belt means having one end which is simultaneously adjustable in the horizontal and vertical directions along said table and an opposite end which is adjustable along the horizontal direction of said table.

9. The tipping table of claim 8 including a rotatable shaft extending horizontally along said table, one end of said belt means being windable about said shaft.

10. The tipping table of claim 9 as opposite end of said belt means extending through said table and being connected to a buckle means.

11. The tipping table of claim 1 wherein said plate means is movable vertically relative to said table and said buckle means is slidable horizontally relative to said plate means.

12. The tipping table of claim 1 including a spring biased locking means for said shaft and hand actuatable release means for same.

13. The tipping table of claim 12 wherein said shaft includes a plurality of axially spaced gripping means for said strap means whereby said strap means may be selectively engaged with either of said axially spaced gripping means in order to adjust the position of said strap means in a horizontal direction along said table.

14. A livestock-tipping table comprising a planar member which is positionable in a generally vertical position and which is revolvable in its entirety about a horizontal axis located distally from the boundaries of the member itself, a stall mounted with said table which comprises a framework extending alongside said table member, and including a gate extending alongside said table member, and including a gate extending generally parallel to said table member, said gate extending generally parallel to said table member, said gate having opposite ends each hingedly mounted to said framework, respective hinge means at said opposite ends comprising readily disassemblable hinge elements.

15. The table of claim 14, said gate including a hinged panel at said opposite ends thereof.

16. The table of claim 14, framework including respective opposite end portions extending generally perpendicular to said table member, each said framework opposite end including a hinged panel respectively adapted to provide access to the head of an animal confined within said stall depending upon whether the left or right side of the animal is positioned against said table member.